UNITED STATES PATENT OFFICE.

CLIFFORD RICHARDSON, OF NEW YORK, N. Y., ASSIGNOR TO THE BARBER ASPHALT PAVING COMPANY, OF PHILADELPHIA, PENNSYLVANIA, A CORPORATION OF WEST VIRGINIA.

MANUFACTURE OF BITUMINOUS ROADWAYS.

No. 923,891.  Specification of Letters Patent.  Patented June 8, 1909.

Application filed September 19, 1908. Serial No. 453,783.

*To all whom it may concern:*

Be it known that I, CLIFFORD RICHARDSON, residing in New York, in the county of New York and State of New York, have invented certain new and useful Improvements in the Manufacture of Bituminous Roadways, whereof the following is a specification.

Bituminous roadways consist of a mineral aggregate, more or less perfectly cemented together by a bituminous cementing material. The excellence of the roadway depends upon the proper grading of the aggregate, the proper proportionment of the cementing material, the proper mixing of the ingredients together, and the proper compression of the materials in place. There is no difficulty in making an admirable bituminous roadway, provided sufficient time and care is bestowed to secure accurate application of these known principles. The difficulty arises from the fact that to properly apply these principles increases the expense of the roadway to an extent which may be prohibitive. The various processes therefore which have been devised for the manufacture of such roadways are in the nature of compromises, and relate to methods by which, without too greatly increasing the expense for labor and materials, a sufficient approximation may be reached to the correct grading, proportionment, mixing and compression of the materials to secure a practical result without prohibitory expense. These methods have varied from those which attempt to accurately grade and proportion the aggregate and mix it after heating with the bituminous cement and then spread and compress it, to those in which the bituminous material is poured over the surface of an imperfectly prepared aggregate or stone of uniform size in the expectation that the cementing material will penetrate or permeate the aggregate somewhat as grouting enters the joints of stone.

By my process at very moderate expense, I am enabled to prepare the material for a roadway from a carefully graded aggregate, and thoroughly combine it with the proper proportion of bituminous cement, and then spread and compress it, without heating the aggregate or using a volatile solvent.

The bituminous cementing material can only be rendered sufficiently fluid to mingle properly with the aggregate by heating. Under all previously used conditions it is difficult to mix hot cementing material with a cold mineral aggregate containing a proper proportion of fine material. Accordingly in all carefully prepared bituminous pavements containing fine material, it has been customary to heat the entire aggregate prior to its incorporation with the hot cementing material. The expensive plant required to accomplish this, together with the cost of fuel and labor involved, and the haul of materials to and from the plant, are a large factor in the cost of the pavement.

I have discovered a process whereby a hot cement may be added on the spot where the work is being executed, to a cold graded aggregate containing fine material, and excellent results secured, without heating the aggregate.

According to my invention I employ a mineral aggregate composed of two materials. One of these is what is commonly known as No. 2 stone, that is to say, crushed stone from three-fourths of an inch to two inches in size, of the type commonly used in the construction of macadam roadways. The other material consists of finer crushed stone, known as screenings, a large proportion of the particles of which are of a size to just pass a three-eighths inch aperture, and ranging from this size to dust. The proper proportion of this latter size should be used to fill the voids in the first mentioned material. With these I combine a bituminous cement, especially prepared to afford proper viscosity and fluidity.

I mix a given quantity of the large stone in a cold but dry state, with the bituminous cement. The mixing may be done in an ordinary binder mixer, and preferably in immediate proximity to the roadway, which is being laid, for which purpose the mixer may be mounted as is the ordinary portable hydraulic concrete mixer. The quantity of the cementing material added to the large stone, is enough to thoroughly coat the stone, together with a certain excess, sufficient to thoroughly coat the fine material, which is subsequently added. The cementing material should be added at a temperature of from 200 to 250 degrees Fahrenheit. After this mixing has been properly accomplished, the finer part of the aggregate is added and mixing is continued until a substantially homogeneous mixture is produced. This mixture is then withdrawn from the mixer, and laid and compressed, upon any suitably prepared roadway, or foundation as a wearing surface. I thus produce a surface containing an aggregate which is sufficiently stable to carry travel combined with a bituminous cement which keeps out water and prevents the formation of dust.

Although attempts have been hitherto made to add a hot bituminous cementing material to a cold mineral aggregate, such attempts have not succeeded without the use of a volatile solvent, because the cement has been added at once to the entire aggregate under which circumstances, I have found that the fine material tends to take up all of the cement so that little or none of it actually adheres to the large stone, but by adding the bituminous material in the first instance to the large stone, together with a sufficient excess and then, after thoroughly mixing, subsequently adding the finer material, I secure, as I have discovered, a very much more satisfactory result.

Having thus described my invention, I claim:—

1. The process of preparing bituminous paving material by the combination of a graded mineral aggregate with a bituminous cementing material, which consists in first mixing all of the required cementing material while hot with the coarser portion of the cold aggregate and subsequently adding the finer part of the aggregate.

2. The process of preparing bituminous paving material which consists in employing a mineral aggregate of two sizes, the one consisting of No. 2 stone and the other screenings from three-eighths of an inch to dust, the latter being proportioned to fill the voids of the former; adding to the large sized material while cold a hot bituminous cement in amount more than sufficient to coat the stone; thoroughly mixing; and then adding the finer material.

In testimony whereof, I have hereunto signed my name, at New York city this twelfth day of September 1908.

CLIFFORD RICHARDSON.

Witnesses:
C. T. BRYAN,
J. L. BRUSSLAR.